United States Patent
Mallick et al.

(10) Patent No.: US 10,219,311 B2
(45) Date of Patent: Feb. 26, 2019

(54) MONITORING AND HANDLING A RADIO LINK FAILURE IN AN INACTIVE STATE

(71) Applicant: Motorola Mobility LLC, Chicago, IL (US)

(72) Inventors: Prateek Basu Mallick, Langen (DE); Joachim Loehr, Wiesbaden (DE); Ravi Kuchibhotla, Clarendon Hills, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 148 days.

(21) Appl. No.: 15/460,081

(22) Filed: Mar. 15, 2017

(65) Prior Publication Data

US 2018/0270871 A1 Sep. 20, 2018

(51) Int. Cl.
| | |
|---|---|
| *H04W 24/08* | (2009.01) |
| *H04W 36/08* | (2009.01) |
| *H04W 36/30* | (2009.01) |
| *H04W 36/36* | (2009.01) |
| *H04W 74/08* | (2009.01) |
| *H04W 76/18* | (2018.01) |
| *H04W 76/19* | (2018.01) |
| *H04W 76/27* | (2018.01) |
| *H04W 88/02* | (2009.01) |

(52) U.S. Cl.
CPC ........... *H04W 76/18* (2018.02); *H04W 24/08* (2013.01); *H04W 36/08* (2013.01); *H04W 36/30* (2013.01); *H04W 36/36* (2013.01); *H04W 74/0833* (2013.01); *H04W 76/19* (2018.02); *H04W 76/27* (2018.02); *H04W 88/02* (2013.01)

(58) Field of Classification Search
CPC ..... H04W 76/18; H04W 76/19; H04W 76/27; H04W 24/08; H04W 36/08; H04W 36/30; H04W 36/36; H04W 74/0833; H04W 88/02
See application file for complete search history.

(56) References Cited

U.S. PATENT DOCUMENTS

| | | | | |
|---|---|---|---|---|
| 2013/0182563 | A1* | 7/2013 | Johansson | H04W 76/18 370/228 |
| 2016/0302151 | A1* | 10/2016 | Jung | H04W 76/18 |
| 2016/0309379 | A1* | 10/2016 | Pelletier | H04W 76/27 |

FOREIGN PATENT DOCUMENTS

WO 2015085273 A1 6/2015

OTHER PUBLICATIONS

Intel Corporation, "Details on the NR_RRC_INACTIVE state", 3GPP TSG RAN WG2 Meeting #96 R2-168523, Nov. 18, 2016, pp. 1-6.
PCT/US2018/022745, "Notification of Transmittal of the International Search Report and the Written Opinion of the International Search Authority, or the Declaration", International Searching Authority, dated Jun. 26, 2018, pp. 1-32.
Huawei, Hisilicon, "State Transitions", 3GPP TSG-RAN WG2 Meeting #96 R2-168560, Nov. 18, 2016, pp. 1-4.

(Continued)

*Primary Examiner* — Ian N Moore
*Assistant Examiner* — Brian T Le
(74) *Attorney, Agent, or Firm* — Kunzler, PC

(57) ABSTRACT

For monitoring and handling a radio link failure in inactive state, a method detects the radio link failure at a mobile communication device in the inactive state. The method further mitigates the radio link failure.

17 Claims, 12 Drawing Sheets

(56) References Cited

OTHER PUBLICATIONS

LTE, "3rd Generation Partnership Project; Technical Specification Group Radio Access Network; Evolved Universal Terrestrial Radio Access (E-UTRA); User Equipment (UE) procedures in idle mode", 3GPP TS 36.304 V14.1.0, Dec. 2016, pp. 1-46.

* cited by examiner

200

| Device State 205 | |
|---|---|
| RLF Flag 210 | |
| Data Packet Count 215 | |
| Acknowledgement Count 220 | |
| Frequency 250 | Frequency Priority 255 |
| Frequency 250 | Frequency Priority 255 |
| Base Station Identifier 225 | |

MONITORING AND HANDLING A RADIO LINK FAILURE IN AN INACTIVE STATE

FIELD

The subject matter disclosed herein relates to a radio link failure and more particularly relates to monitoring and handling a radio link failure in an inactive state.

BACKGROUND

Description of the Related Art

A mobile communication device may be placed in an inactive state

BRIEF SUMMARY

A method for monitoring and handling a radio link failure in inactive state is disclosed. The method detects the radio link failure at a mobile communication device in an inactive state. The method further mitigates the radio link failure. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
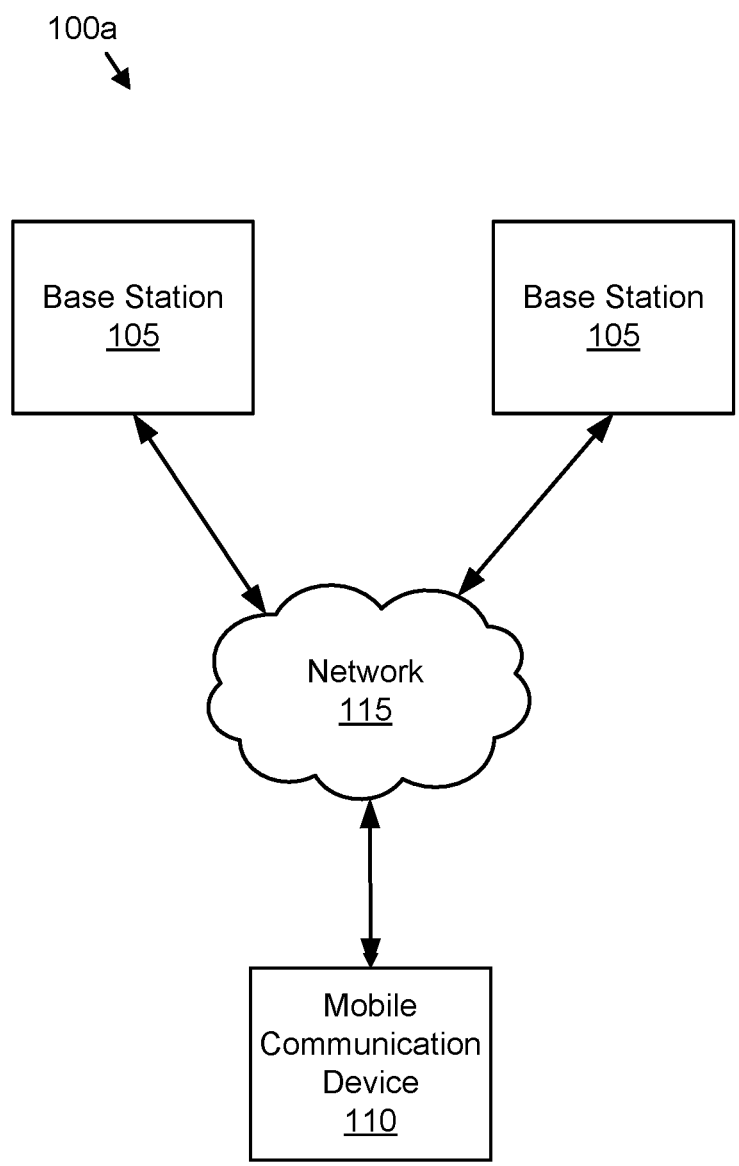
FIG. 1A is a schematic block diagram illustrating one embodiment of a mobile communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a mobile communication system 100*a*. The system 100*a* includes one or more base stations 105, a network 115, and a mobile communication device 110. One or more base stations 105 may communicate with the mobile communication device 110 through the network 115. The base stations 105 may be evolved node B (eNB) Long Term Evolution (LTE) base stations. Alternatively, the base stations 105 may be a server, a data center, and the like. The mobile communication device 110 may be a mobile telephone, a machine-type communications (MTC) device, a tablet computer, a laptop computer, and embedded communication devices in automobiles, kiosks, appliances, and the like. The network 115 may be a mobile telephone network, a wide-area network, a wireless network, or combinations thereof.

In one embodiment, the mobile communication device 110 is in one or more states such as Radio Resource Control (RRC) states. The mobile communication device 110 may be in an inactive state such as a RRC inactive state. The RRC inactive state is distinguished from an RRC idle state and an RRC connected state. While the mobile communication device 110 is in the inactive state, the mobile communication device 110 may experience a radio link failure (RLF). The embodiments described herein monitor for, detect, and handle the RLF for the mobile communication device 110 in the inactive state as will be described hereafter.

Figure 1B:
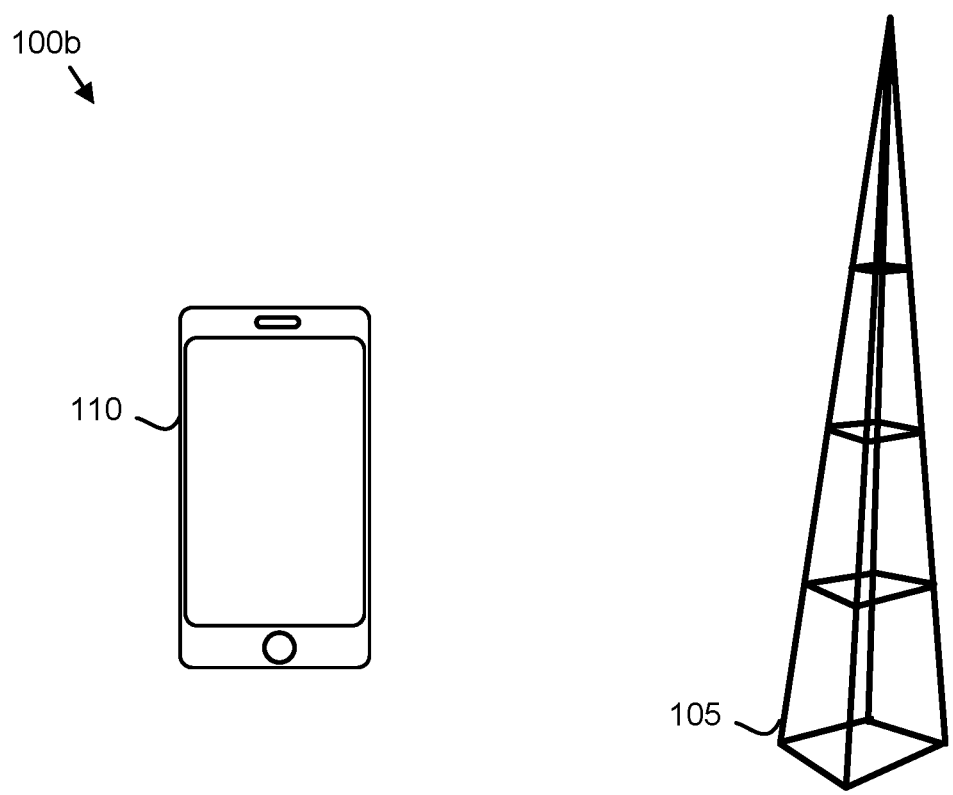
FIG. 1B is a drawing illustrating one alternate embodiment of a mobile communication system.

FIG. 1B is a drawing illustrating one alternate embodiment of the mobile communication system 100b. The mobile communication device 110 is depicted as a mobile telephone. The base station 105 is depicted as a radio tower.

Figure 2:
FIG. 2 is a schematic block diagram illustrating one embodiment of device data.

FIG. 2 is a schematic block diagram illustrating one embodiment of device data 200. The device data 200 may be organized as a data structure in a memory on the mobile communication device 110. In the depicted embodiment, the device data 200 includes a device state 205, an RLF flag 210, a data packet count 215, an acknowledgment count 220, one or more frequencies 250 and corresponding frequency priorities 255, and a base station identifier 225.

The device state 205 may specify the state of the mobile communication device 110 such as the inactive state, the idle state, an RLF state, and the connected state. The RLF flag 210 may be set to indicate the detection of an RLF.

The data packet count 215 may record a number of data packets that are transmitted by the mobile communication device 110 prior to receiving an acknowledgment from the base station 105. The data packet count 215 may count a number of discrete data packets that are transmitted. Alternatively, the data packet count 215 may record a number of data packets including retransmissions of data packets that are transmitted by the mobile communication device 110. In one embodiment, the data packet count 215 is reset to zero each time an acknowledgment (ACK) is received from the base station 105.

The acknowledgment count 220 may record a number of acknowledgments received from the base station 105. In one embodiment, the acknowledgment count 220 is reset each time data packets are transmitted by the mobile communication device 110 to the base station 105.

The one or more frequencies 250 may each specify a mobile communication frequency. The frequency priorities 255 may specify a priority of the corresponding frequency 250. The base station identifier 225 may identify a connected base station 105.

Figure 3:
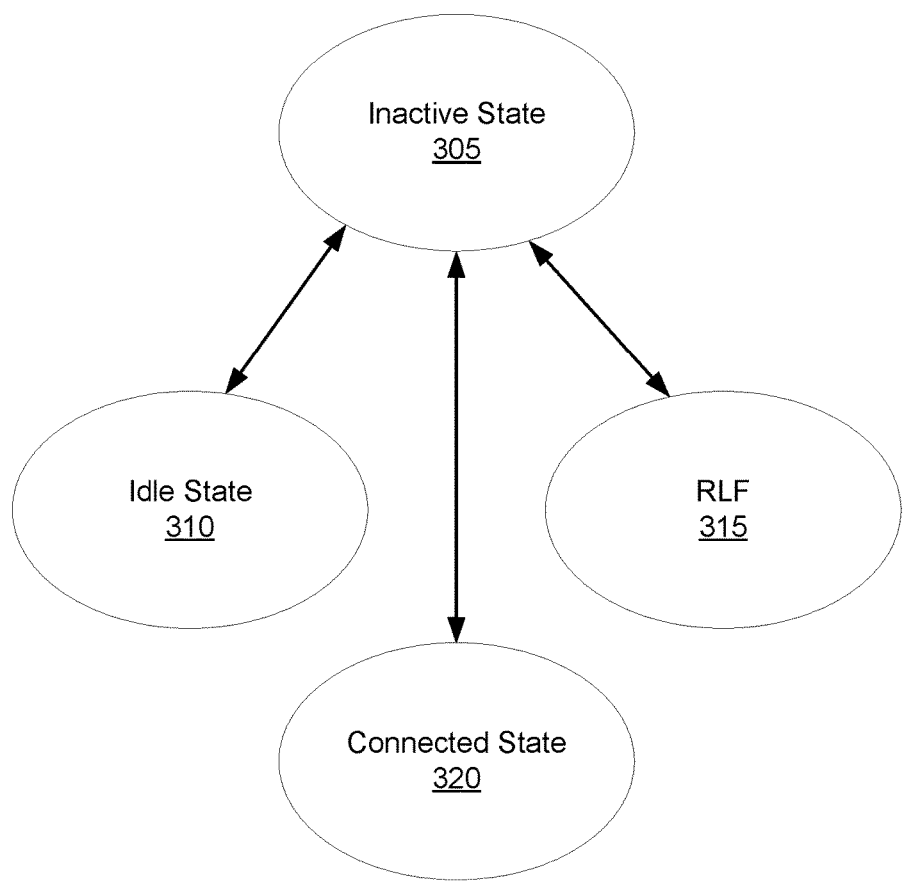
FIG. 3 is a schematic diagram illustrating one embodiment of device states.

FIG. 3 is a schematic diagram illustrating one embodiment of device states of the mobile communication device 110. The device states may be RRC states. In the depicted embodiment, the device states include the inactive state 305, the idle state 310, the connected state 320, and the RLF state 315. The mobile communication device 110 may be in the inactive state 305. In addition, the mobile communication device 310 may transition to one of the idle state 310, the connected state 320, and the RLF 315.

Figure 4:
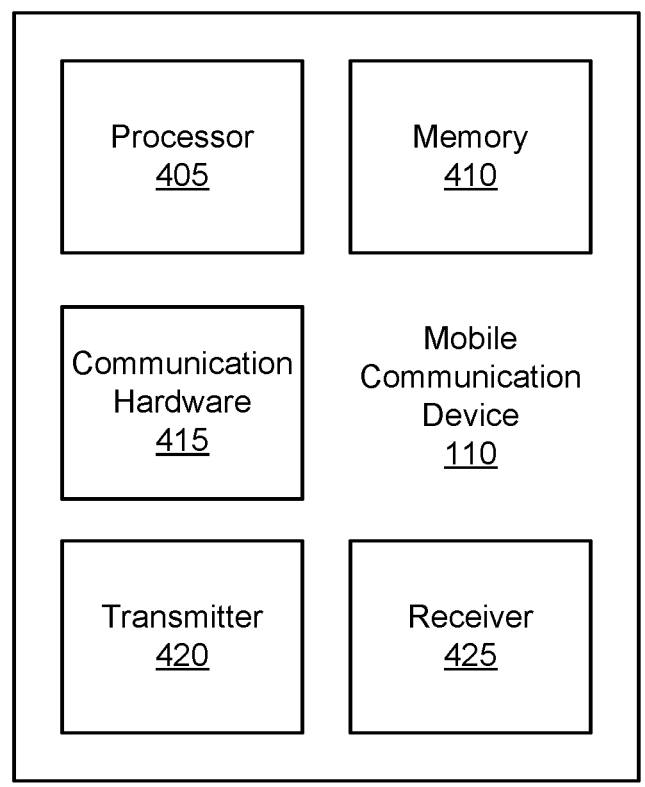
FIG. 4 is a schematic block diagram illustrating one embodiment of a mobile communication device.

FIG. 4 is a schematic block diagram illustrating one embodiment of the mobile communication device 110. In the depicted embodiment, the mobile communication device 110 includes a processor 405, a memory 410, communication hardware 415, a transmitter 420, and receiver 425. The memory 410 may be a semiconductor storage device. In addition, the memory 410 may include a hard disk drive, an optical storage device, and/or a micromechanical storage device. The memory 410 may store code. The processor 405 may execute the code. The communication hardware 415 may manage communication through the transmitter 420 and the receiver 425. The transmitter 420 may communicate data packets to the base station 105. The receiver 425 may receive data packets from the base station 105.

Figure 5A:
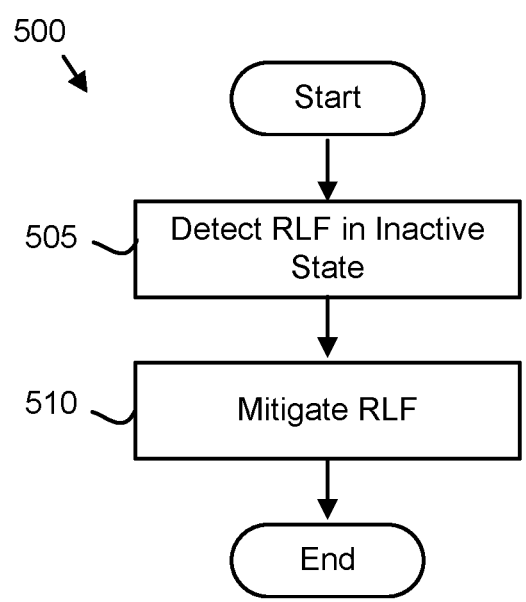
FIG. 5A is a schematic flow chart diagram illustrating one embodiment of a radio link management method.

FIG. 5A is a schematic flow chart diagram illustrating one embodiment of a radio link management method 500. The method 500 may detect an RLF while the mobile communication device 110 is in the inactive state 305. The method 500 may further mitigate the RLF in the inactive state 305. The method 500 may be performed by the mobile communication device 110 and/or elements thereof such as the processor 405.

The method 500 starts, and in one embodiment, the processor 405 detects 505 the RLF at the mobile communication device 110 in the inactive state 305. The inactive state 305 may be detected 505 in response to one or more of a T310 expiry, a Random Access (RACH) failure, an indication for a Radio Link Control (RLC) for an Automatic Repeat Request (ARQ) procedure, an integrity check failure, and an RRC Connection Reconfiguration failure. Alternatively, the RLF may be detected 505 as described in FIG. 5B.

The processor 405 may mitigate 510 the RLF and the method 500 ends. The processor 405 may mitigate 510 the RLF in response to detecting the RLF while the mobile communication device 110 is in the inactive state 305. The mitigation 510 of the RLF is described in more detail in FIGS. 5C-F. The methods described in FIGS. 5C-F may be employed singly or in any combination to mitigate 510 the RLF.

Figure 5B:
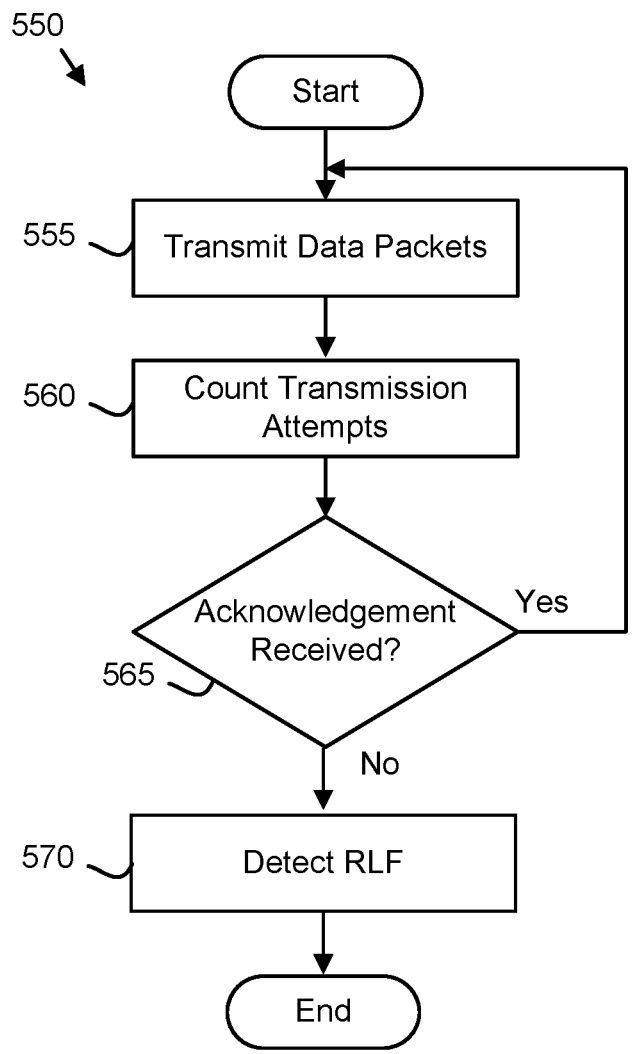
FIG. 5B is a schematic flow chart diagram illustrating one embodiment of a radio link failure detection method.

FIG. 5B is a schematic flow chart diagram illustrating one embodiment of a radio link failure detection method 550. The method 550 may detect the RLF. In one embodiment, the method 550 performs step 505 of FIG. 5A. The method 550 may be performed by the mobile communication device 110 and/or elements thereof such as the processor 405.

The method 550 starts, and in one embodiment, the processor 405 transmits 555 one or more data packets. The data packets may be transmitted 555 from the transmitter 420 to the base station 105. The processor 405 may further count 560 transmission attempts and record the data packet count 215. The data packets may be discrete data packets and/or retransmissions of one or more original data packets. In one embodiment, the processor 405 transmits 555 a specified number of data packets to a current base station 105. The specified number may be in the range of 3 to 7. In one embodiment, the specified number of data packets is five.

The processor 405 may determine 565 if the acknowledgment is received for any of the specified number of data packets. If the acknowledgment is received for any of the specified number of data packets, the processor 405 continues to transmit 555 data packets. If no acknowledgment for any of the data packets is received, the processor 405 may detect 570 the RLF and the method 550 ends. In one embodiment, the processor 405 sets the RLF flag 210 to indicate the RLF.

Figure 5C:
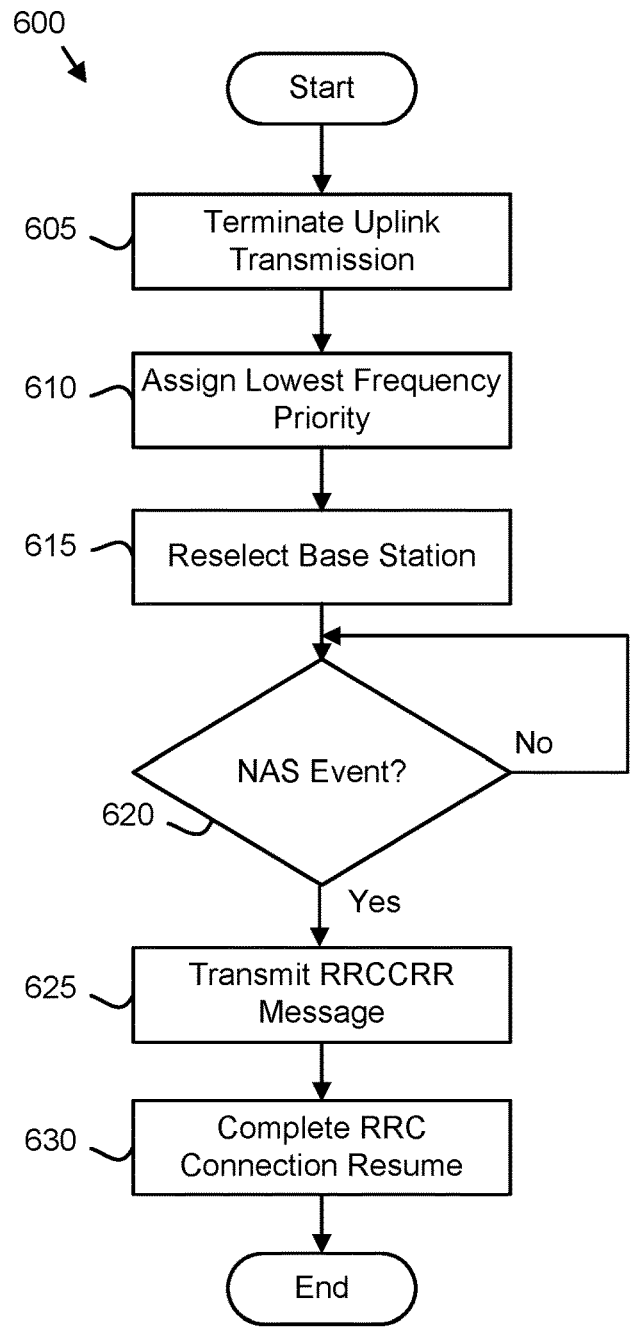
FIG. 5C is a schematic flow chart diagram illustrating one embodiment of an inactive state connection method.

FIG. 5C is a schematic flow chart diagram illustrating one embodiment of an inactive state connection method 600. The method 600 may mitigate the RLF by connecting the wireless communication device 110 to a base station 105. In one embodiment, the method 600 performs step 510 of FIG. 5A. The method 600 may be performed by the mobile communication device 110 and/or elements thereof such as the processor 405.

The method 600 starts, and in one embodiment, the processor 405 terminates 605 an uplink transmission from the mobile communication device 110 to the base station 105. In addition, the processor 405 may assign 610 a lowest frequency priority 255 to a current frequency 250 in use by the wireless communication device 110. The assignment of the lowest priority 255 to the current frequency 250 may expire after a specified time interval.

The processor 405 may reselect a base station 105. The base station 105 may be reselected in accordance with RRC specification TS 36.304[4]. In one embodiment, the reselected base station 105 is recorded in the base station identifier 225. The processor 405 may determine 620 if a Non-Access Stratum (NAS) event occurs. The NAS event may include an arrival of data, NAS signaling, or combinations thereof. In one embodiment, the processor 405 and/or the mobile communication device 110 monitors for the NAS event. If the NAS event is not detected 620, the processor 405 may continue to monitor for the NAS event.

In response to detecting the NAS event, the processor 405 may transmit 625 a RRC Connection Re-establishment Request message. The RRC Connection Re-establishment Request message may be transmitted to the reselected base station 105. In one embodiment, the RRC Connection Re-establishment Request message is transmitted 625 in response to initiation by an upper layer of a communication protocol. The upper layer may be a NAS stratum. The processor may further complete 630 an RRC Connection Re-establishment procedure with the base station 105 and the method 600 ends.

Figure 5D:
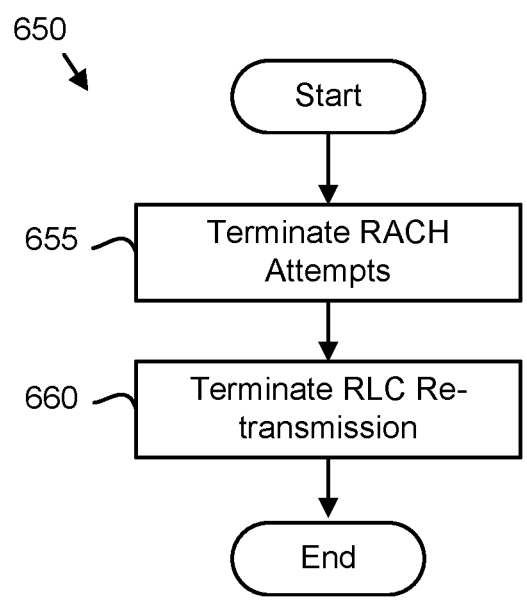
FIG. 5D is a schematic flow chart diagram illustrating one alternate embodiment of an inactive state connection method.

FIG. 5D is a schematic flow chart diagram illustrating one alternate embodiment of an inactive state connection method 650. The method 650 may mitigate the RLF by connecting the wireless communication device 110 to a base station 105. In one embodiment, the method 650 performs step 510 of FIG. 5A. The method 650 may be performed by the mobile communication device 110 and/or elements thereof such as the processor 405.

The method 650 starts, and in one embodiment, the processor 405 terminates 655 Random Access (RACH) attempts from the mobile communication device 110 to the base station 105. In a certain embodiment, the processor 405 terminates 660 RLC re-transmissions from the mobile communication device 110 to the base station 105 and the method 650 ends.

Figure 5E:
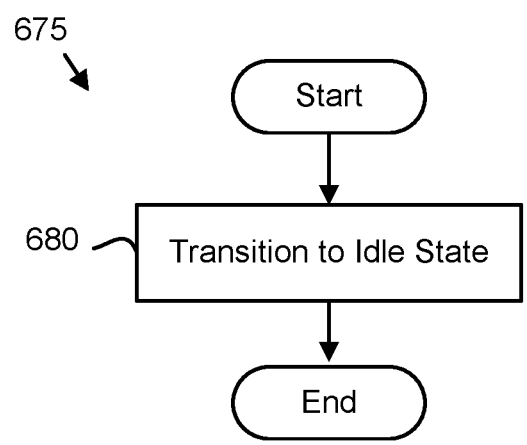
FIG. 5E is a schematic flow chart diagram illustrating one alternate embodiment of an inactive state connection method.

FIG. 5E is a schematic flow chart diagram illustrating one alternate embodiment of an inactive state connection method 675. The method 675 may mitigate the RLF by connecting the wireless communication device 110 to a base station 105. In one embodiment, the method 675 performs step 510 of FIG. 5A. The method 675 may be performed by the mobile communication device 110 and/or elements thereof such as the processor 405.

The method 675 starts, and in one embodiment, the processor 405 transitions 680 the mobile communication device 110 to the idle state 310. The processor 405 may transition 680 the mobile communication device 110 from the inactive state 305 to the idle state 310 and the method 675 ends.

Figure 5F:
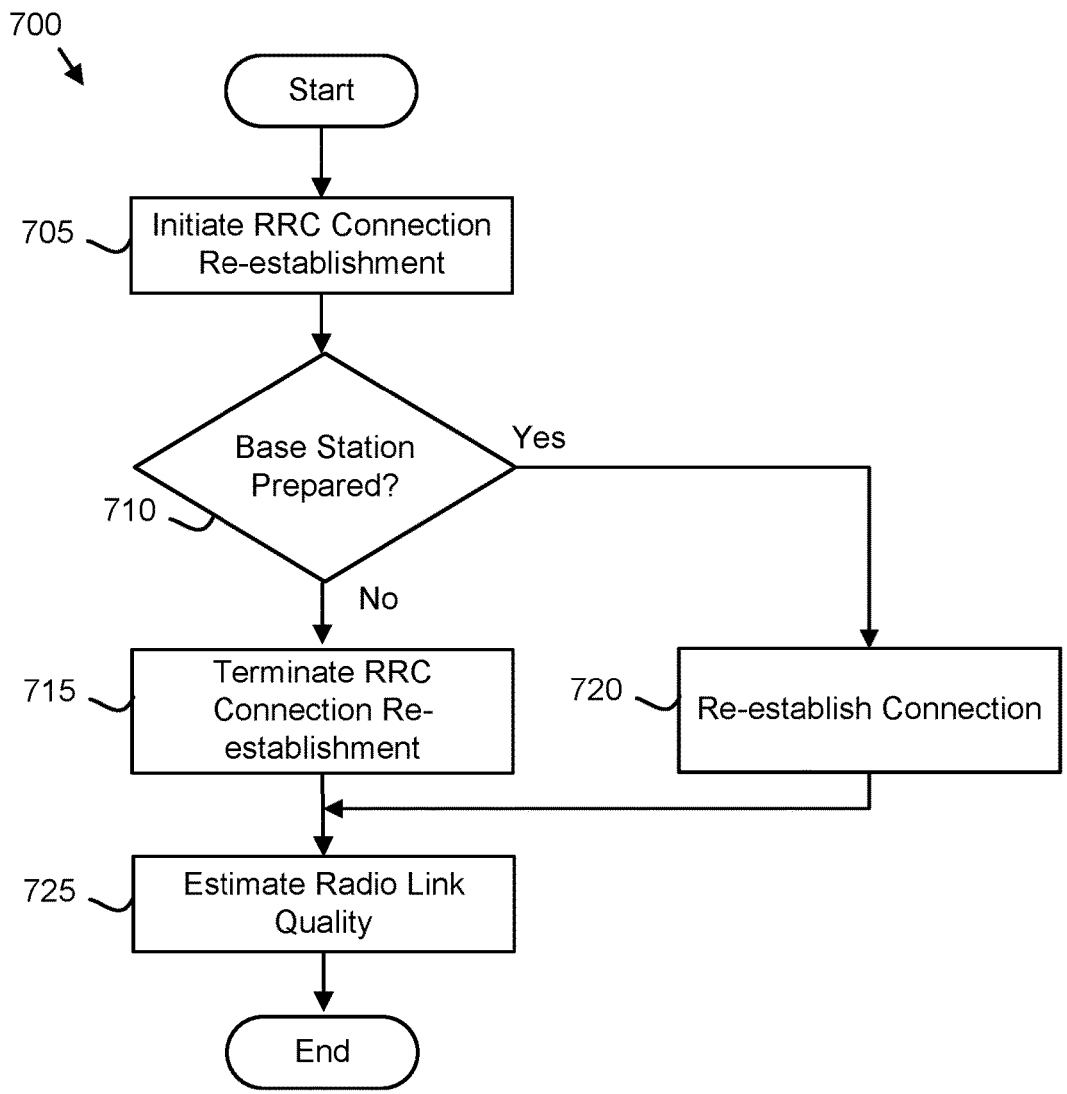
FIG. 5F is a schematic flow chart diagram illustrating one alternate embodiment of an inactive state connection method.

FIG. 5F is a schematic flow chart diagram illustrating one alternate embodiment of an inactive state connection method 700. The method 700 may mitigate the RLF by connecting the wireless communication device 110 to a base station 105. In one embodiment, the method 700 performs step 510 of FIG. 5A. The method 700 may be performed by the mobile communication device 110 and/or elements thereof such as the processor 405.

The method 700 starts, and in one embodiment, the processor 405 initiates 705 an RRC Connection Re-establishment procedure. The RRC Connection Re-establishment procedure may be initiated 705 with the current base station 105. In an alternate embodiment, the processor 405 initiates 705 the RRC Connection Re-establishment procedure with the Selected or reselected base station 105. The processor 405 may further determine 710 if the base station 105 is prepared for the RRC Connection Re-establishment procedure.

If the base station 105 is prepared for the RRC Connection Re-establishment procedure, the processor 405 re-establishes 720 connection with the base station 105. If the base station 105 is not prepared for the RRC Connection Re-establishment procedure, the processor 405 terminates 715 the RRC Connection Re-establishment procedure. The processor 405 further estimates 725 a radio link quality and the method 700 ends. The estimate of the radio link quality may be based on a signal strength measured during the RRC Connection Re-establishment procedure.

Figure 5G:
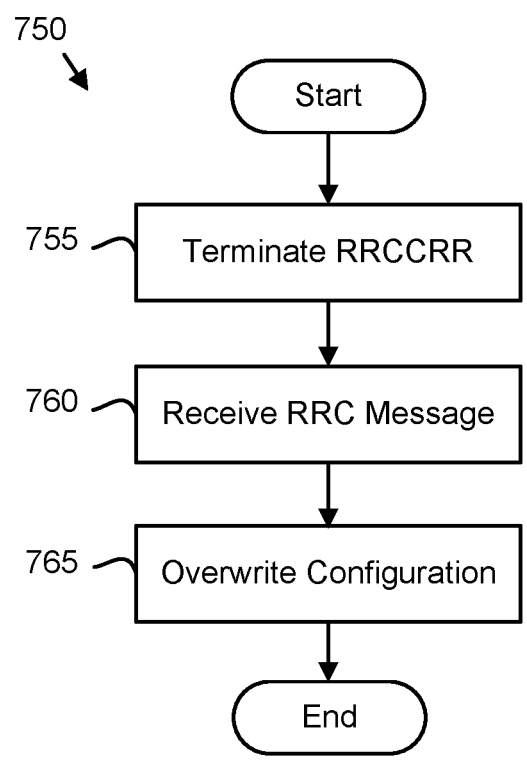
FIG. 5G is a schematic flow chart diagram illustrating one embodiment of a configuration modification method.

FIG. 5G is a schematic flow chart diagram illustrating one alternate embodiment of a configuration modification method 750. The method 750 may modify the configuration of the mobile communication device 110. The method 750 may be performed by the mobile communication device 110 and/or elements thereof such as the processor 405. Portions of the method 750 may be performed while the mobile communication device 110 is in the inactive state 305.

The method 750 starts, and in one embodiment, the processor 405 terminates 755 an RRC Connection Re-establishment Request prior to detecting the RLF. The mobile communication device 110 may be in one of a connected state 320 and an inactive state 305.

The processor 405 further receives 760 at least one RRC message. The RRC message may be an RRC Connection Re-establishment message. In addition, the RRC message may be an RRC Connection Reconfiguration message. The mobile communication device 110 may be in one of the connected state 320 and the inactive state 305. In one embodiment, the RRC message comprises a new configuration for the mobile communication device 110.

The processor 405 may overwrite 765 the current configuration of the mobile communication device 110 with the new configuration to mitigate the RLF and the method 750 ends. In one embodiment, the new configuration may generally overwrite all of the current configuration. Alternatively, the new configuration may selectively overwrite a portion of the current configuration. The current configuration may be overwritten 765 in response to detecting the RLF. In addition, the current configuration may be overwritten 765 to mitigate the RLF as part of step 510 of FIG. 5A.

The embodiments detect the RLF at a mobile communication device 110 in an inactive state 305. As a result, the inactive state 305 may be employed while continuing to monitor for the RLF. The embodiments further mitigate the RLF detected in the inactive state 305. As a result, the mobile communication device 110 may reliably employ the inactive state 305 in operations.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   detecting, by use of a processor, a radio link failure (RLF) at a mobile communication device in an inactive state;
   mitigating the RLF by:
   terminating uplink transmission;
   assigning a lowest frequency priority to a current frequency, wherein the assignment expires after a specified time interval;
   reselecting a base station;
   in response to a Non-Access Stratum (NAS) event, transmitting a Radio Resource Control (RRC) Connection Re-establishment Request message; and
   completing an RRC Connection Re-establishment procedure.

2. The method of claim 1, wherein the inactive state is an RRC inactive state.

3. The method of claim 1, wherein the base station is reselected in accordance with RRC specification TS 36.304 [4].

4. The method of claim 1, wherein the RRC Connection Re-establishment Request message is transmitted in response to initiation by an upper layer of a communication protocol.

5. The method of claim 1, wherein mitigating the RLF comprises:
   terminating Random Access (RACH) attempts from the mobile communication device; and
   terminating Radio Link Control (RLC) re-transmissions.

6. The method of claim 1, wherein mitigating the RLF comprises:
   transitioning the mobile communication device to an idle state.

7. The method of claim 1, wherein mitigating the RLF comprises:
   initiating an RRC Connection Re-establishment procedure; and
   in response to a target base station not being prepared, terminating the RRC Connection Re-establishment procedure.

8. The method of claim 1, the method further comprising:
   transmitting an RRC Connection Re-establishment Request prior to detecting the RLF, wherein the mobile communication device is in one of a connected state and an inactive state;
   receiving at least one RRC message; and
   overwriting a current configuration to mitigate the RLF.

9. The method of claim 1, wherein detecting the RLF comprises:
   transmitting a specified number of data packets to a current base station; and
   detecting the RLF in response to receiving no acknowledgement for any of the data packets.

10. The method of claim 1, wherein the RLF is detected in response to one or more of a T310 expiry, a RACH failure, an indication for a Radio Link Control (RLC) for an Automatic Repeat Request (ARQ) procedure, an integrity check failure, and an RRC Connection Reconfiguration failure.

11. An apparatus comprising:
    a processor performing:
    detecting a radio link failure (RLF) at a mobile communication device in an inactive state;
    mitigating the RLF by:
    terminating uplink transmission;
    assigning a lowest frequency priority to a current frequency, wherein the assignment expires after a specified time interval;
    reselecting a base station;
    in response to a Non-Access Stratum (NAS) event, transmitting a Radio Resource Control (RRC) Connection Re-establishment Request message; and
    completing an RRC Connection Re-establishment procedure.

12. The apparatus of claim 11, wherein the inactive state is an RRC inactive state.

13. The apparatus of claim 11, wherein the base station is reselected in accordance with RRC specification TS 36.304 [4].

14. The apparatus of claim 11, wherein the RRC Connection Re-establishment Request message is transmitted in response to initiation by an upper layer of a communication protocol.

15. The apparatus of claim 11, wherein the code is further executable by the processor to perform:
    terminating Random Access (RACH) attempts from the mobile communication device; and
    terminating Radio Link Control (RLC) re-transmissions.

16. A program product comprising a non-transitory computer readable storage medium that stores code executable by a processor, the executable code comprising code to perform:
    detecting a radio link failure (RLF) at a mobile communication device in an inactive state;
    mitigating the RLF by:
    terminating uplink transmission;
    assigning a lowest frequency priority to a current frequency, wherein the assignment expires after a specified time interval;
    reselecting a base station;
    in response to a Non-Access Stratum (NAS) event, transmitting a Radio Resource Control (RRC) Connection Re-establishment Request message; and
    completing an RRC Connection Re-establishment procedure.

17. The program product of claim 16, wherein the inactive state is an RRC inactive state.

* * * * *